United States Patent
Johnson et al.

(12)

(10) Patent No.: US 6,432,173 B1
(45) Date of Patent: Aug. 13, 2002

(54) CENTRIFUGAL SEPARATOR ARRANGEMENT FOR POWDER COATING RECOVERY SYSTEM AND METHODS

(75) Inventors: James Edward Johnson, Apple Valley; James Michael Browning, Burnsville; Timothy Camiel Buyck, Rosemont, all of MN (US); Michael Joseph Thies, Indianapolis, IN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/697,865

(22) Filed: Oct. 27, 2000

(51) Int. Cl.[7] ............................ B01D 45/14; B05B 15/12
(52) U.S. Cl. .......................... 95/269; 55/347; 55/348; 55/356; 55/429; 55/502; 55/457; 55/DIG. 46; 118/326; 118/DIG. 7; 454/56
(58) Field of Search .................... 55/345, 346, 347, 55/348, 429, 356, 457, 502, DIG. 46; 118/326, DIG. 7; 454/56

(56) References Cited

U.S. PATENT DOCUMENTS

| | | | |
|---|---|---|---|
| 2,887,177 A | 5/1959 | Mund et al. | |
| 2,889,008 A | 6/1959 | Copp et al. | |
| 3,498,461 A | 3/1970 | Miller | |
| 4,162,906 A | 7/1979 | Sullivan et al. | |
| 4,407,663 A | * 10/1983 | Hawley | 312/111 |
| 4,504,292 A | * 3/1985 | Vohringer | 118/DIG. 7 |
| 4,746,340 A | * 5/1988 | Durre et al. | 55/347 |
| 5,256,201 A | * 10/1993 | Gelain et al. | 118/308 |
| 6,080,217 A | * 6/2000 | Gobl et al. | 55/283 |

OTHER PUBLICATIONS

GEMA Brochure "The Diamond Powder Booth", Part No. 119979, (1995).

ITW GEMA Brochure "VORTECH Series Powder Coating Booth", Part No. 124276 (1998).

* cited by examiner

*Primary Examiner*—Robert A. Hopkins
(74) *Attorney, Agent, or Firm*—Merchant & Gould P.C.

(57) ABSTRACT

Methods and systems for recovering paint include utilizing a plurality of centrifugal separator modules downstream of a paint booth. Each of the centrifugal separator modules includes a plurality of centrifugal separators. Each of the centrifugal separators separates at least a portion of the paint particles from an air stream.

17 Claims, 8 Drawing Sheets

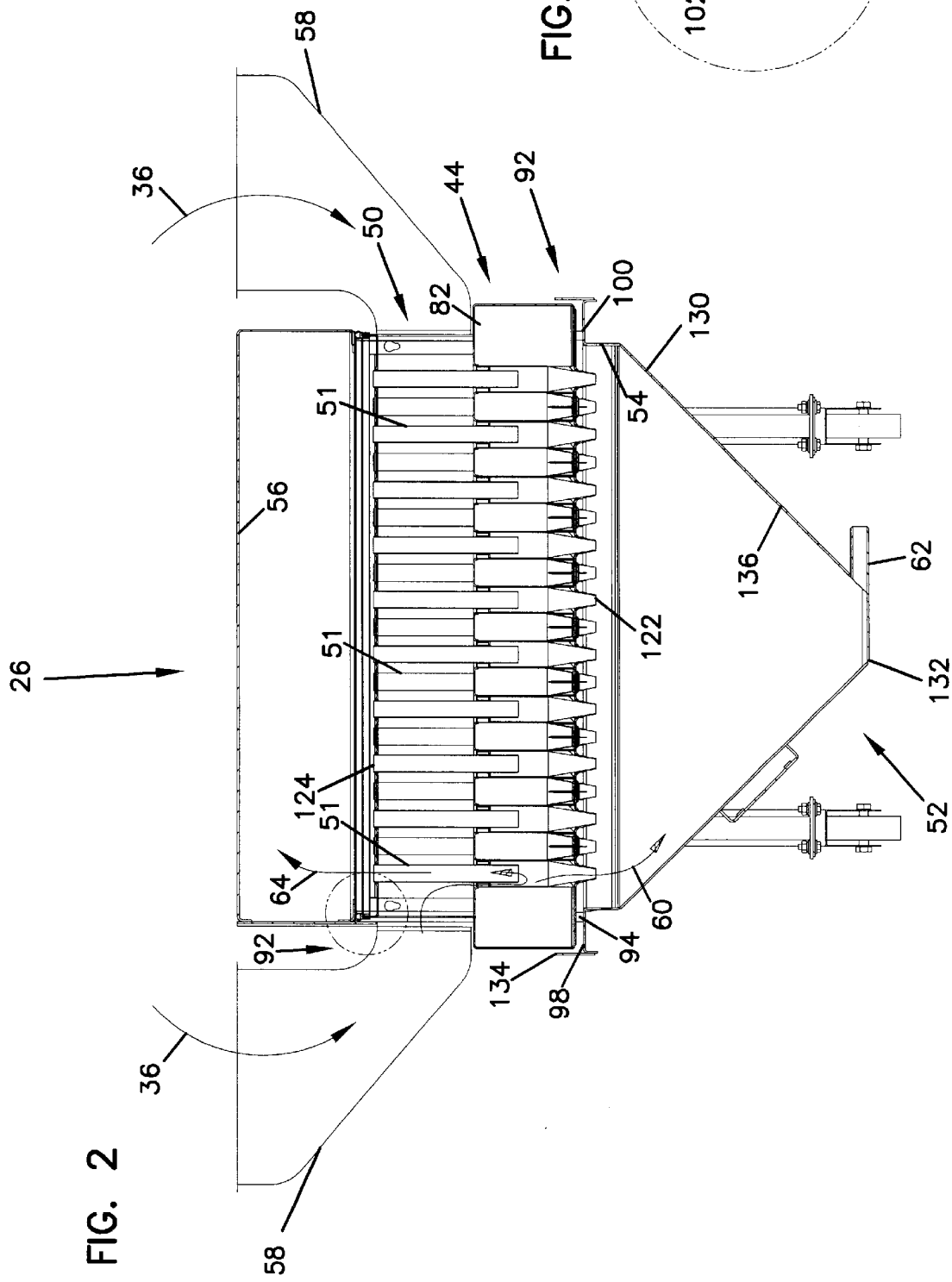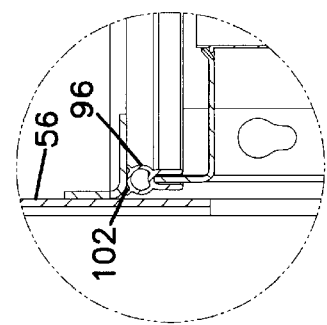

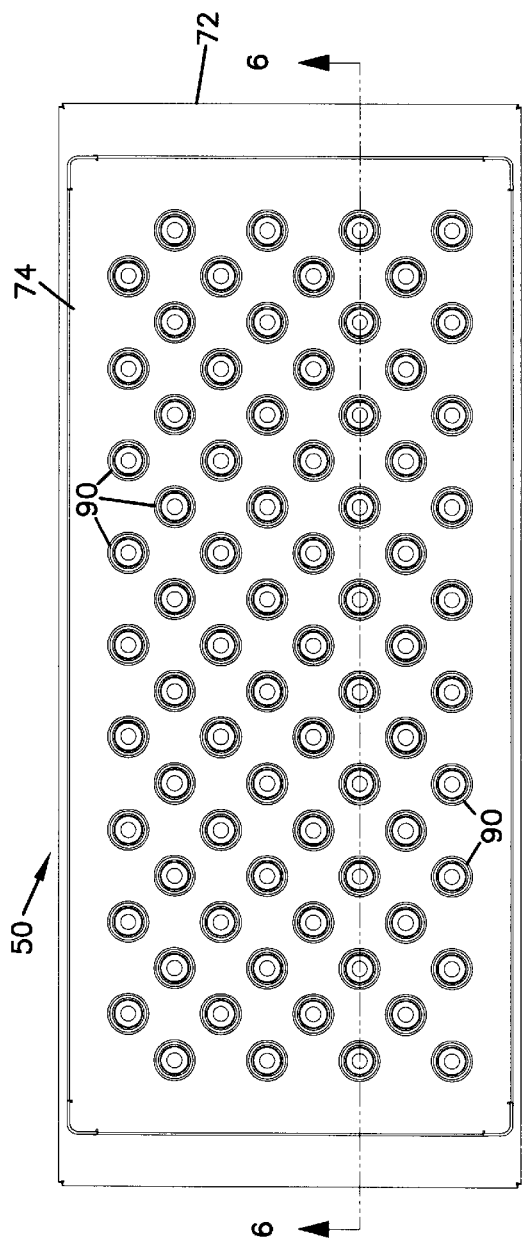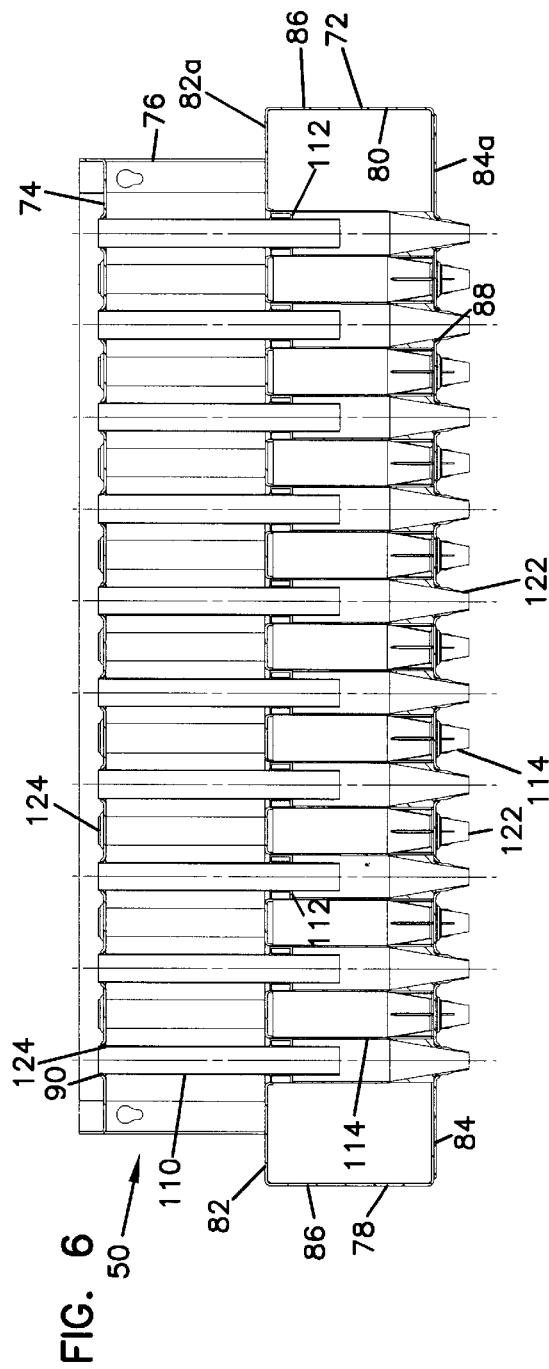

CENTRIFUGAL SEPARATOR ARRANGEMENT FOR POWDER COATING RECOVERY SYSTEM AND METHODS

TECHNICAL FIELD

This disclosure is directed to constructions and methods of separation, in particular, separation of powder coating (e.g. paint particles) from gas streams. In particular, this disclosure is directed to centrifugal separator constructions, methods of operation, methods of change-out, and methods of use.

BACKGROUND

Manufactured products typically need to be painted. One type of technique for painting manufactured products is powdered paints that are sprayed onto the article. One type of system sometimes used to apply powder paints includes a booth. In one system, the article to be painted is placed in the booth, and the paint is sprayed onto the article.

During use, there is typically excess paint. It is desirable to have a system to capture and recycle the excess paint. It is also desirable to have a system that can capture and recycle the excess paint, while also being amenable to quick color change of the paint.

SUMMARY

Methods and systems for recovering powder coating, e.g. paint particles, are described. In one disclosed method, a gas stream entrained with powder coating (e.g. paint particles) is directed from a paint booth into a plurality of centrifugal separators. Each of these centrifugal separators separates at least a portion of the paint particles from the gas stream. Each of these centrifugal separators includes a central hub member defining a clean gas flow passage therethrough; a plurality of circumferentially spaced deflecting vanes positioned adjacent to the hub member in a radiating orientation; and a lower tube circumscribing a portion of the central hub member, and the plurality of circumferentially spaced deflecting vanes.

In preferred embodiments, the step of directing the gas stream includes directing the gas stream into a module including the plurality of centrifugal separators held by a housing. In many preferred arrangements, there is a system holding a plurality of such modules. Preferably, the system is removable, cleanable, and replaceable from the paint booth.

In preferred methods, there is a step of removing the system holding the plurality of modules and orienting a second system holding a new plurality of modules downstream of the paint booth.

In one arrangement, there is disclosed a coated material, or paint, recovery system including a paint booth, a plurality of centrifugal separator modules downstream of the paint booth, a duct, a seal arrangement, and a gas flow direction arrangement.

In preferred arrangements, each of these centrifugal separator modules includes a housing, and a plurality of centrifugal separators held by the housing. In preferred embodiments, the duct forms a clean gas plenum and is oriented downstream and in gas flow communication with clean gas flow passages of central hub members of the centrifugal separators. In preferred embodiments, the seal arrangement forms a seal between the duct and each of the centrifugal separator modules. Preferred embodiments include the gas flow direction arrangement as directing the gas stream entrained with paint particles from the paint booth, through the plurality of centrifugal separator modules to separate the paint particles from the gas stream, and direct the cleaned gas stream into the duct.

Also disclosed is a centrifugal separator module arrangement. The centrifugal separator module arrangement will preferably include a housing and a plurality of centrifugal separators held by the housing. Preferably, the housing includes a box construction and a panel secured together. Preferably, each of the centrifugal separators include, for example, a central hub member defining a clean airflow passage therethrough, a plurality of circumferentially spaced deflecting vanes positioned adjacent to the hub member in a radiating orientation therewith, and a lower tube circumscribing a portion of the central hub member and the plurality of circumferentially spaced deflecting vanes.

The disclosure also describes a system for providing centrifugal separation. Preferred systems typically include a hopper, a plurality of centrifugal separator modules, and a seal arrangement forming a seal between each of the centrifugal separator modules and the hopper.

BRIEF DESCRIPTION OF THE DRAWINGS

FIG. 2 is a schematic, cross-sectional view of a system for centrifugal separation, constructed according to principles of this disclosure;

FIG. 3 is an enlarged, fragmented, cross-sectional view of one portion of a seal arrangement, taken from the section shown in FIG. 2;

FIG. 5 is a top plan view of the centrifugal separator module shown in FIG. 4;

FIG. 6 is a cross-sectional view of the centrifugal separator module taken along the line 6—6 of FIG. 5;

DETAILED DESCRIPTION

Figure 1:
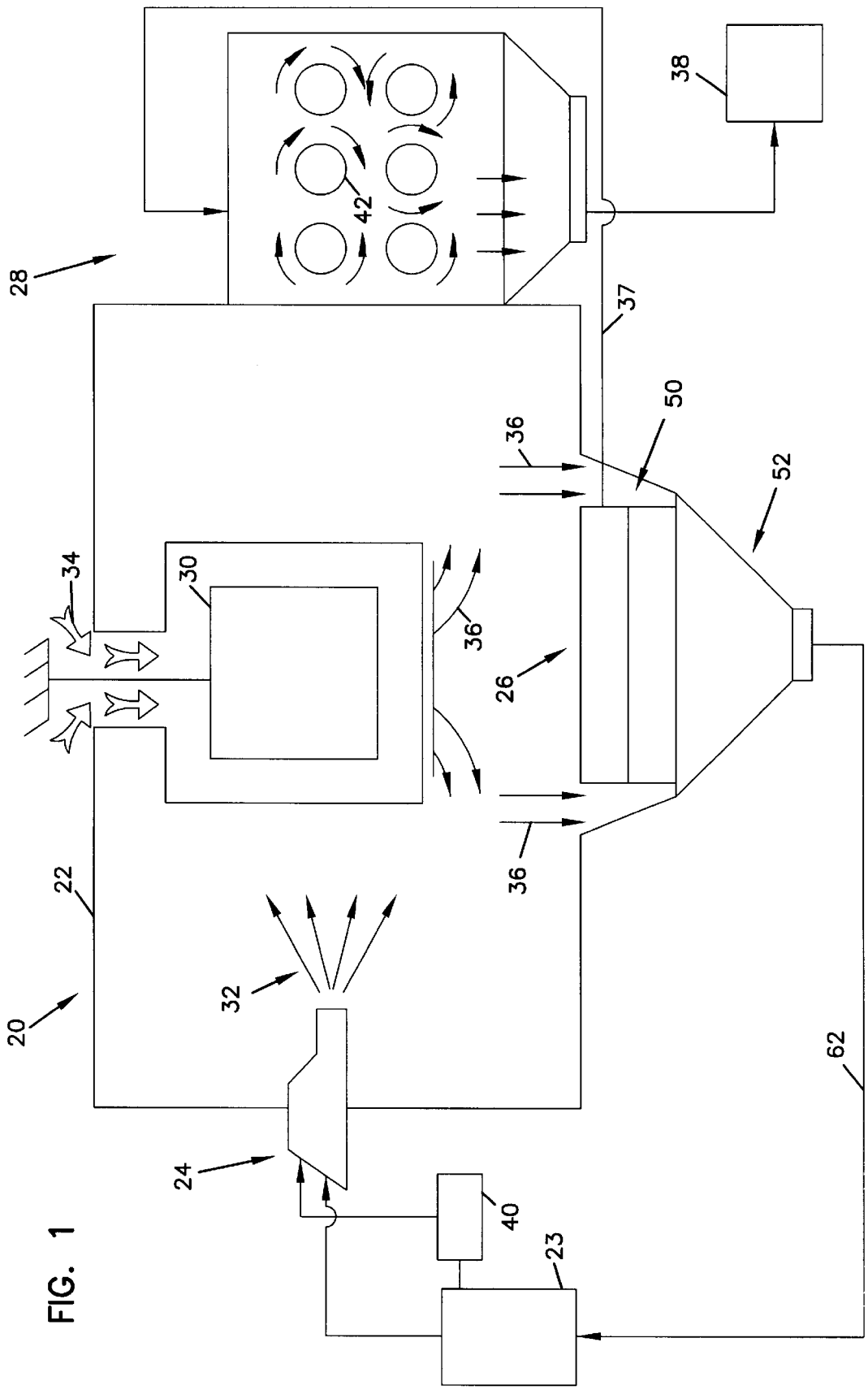
FIG. 1 is a schematic view showing a paint recovering system, illustrating principles of this disclosure.

A paint system, or coated material system, is shown generally at 20. The paint system 20 includes a paint booth 22, a paint applicator 24, a paint recovery arrangement 26, and an air cleaner system 28. In general, in operation, an article or item 30 to be coated or painted is mounted within the paint booth 22. A supply of powder coating (paint particles) 23 is applied to the article 30 by application from the paint applicator 24 in a spray form 32. As can be seen in FIG. 1, the paint is kept in a paint supply 23 and a control unit 40 functions to control application of the paint 32 through the applicator 24. Air 34 is directed into the paint booth 22 and mixes with the paint 32. A paint and air mixture (for example, a gas flow stream entrained with paint particles) is shown at 36 being drawn into the paint recovery arrangement 26. The paint recovery arrangement 26 separates the paint particles from the gas stream. The paint is collected in the paint recovery arrangement 26 and returned to the paint supply 23 for re-use. The gas separated from the air/paint mixture 36 is directed to the air cleaner system 28 through appropriate duct-work 37. The air cleaner system 28 cleans the gas of most of the remaining paint particles. The air cleaner system 28 can include those of the type having a plurality of cylindrical filter elements 42 and as described in U.S. Pat. No. 4,395,269, incorporated by reference herein. Paint removed from the air cleaner system 28 is typically sent to a scrap barrel 38. The air cleaner system 28 also: (i) creates the air volume to contain powder in the booth 22; (ii) pulls the air through the entire system; and (iii) returns the cleaned air to the room.

Details of the powder coating recovery arrangement 26 are now described.

Figure 4:
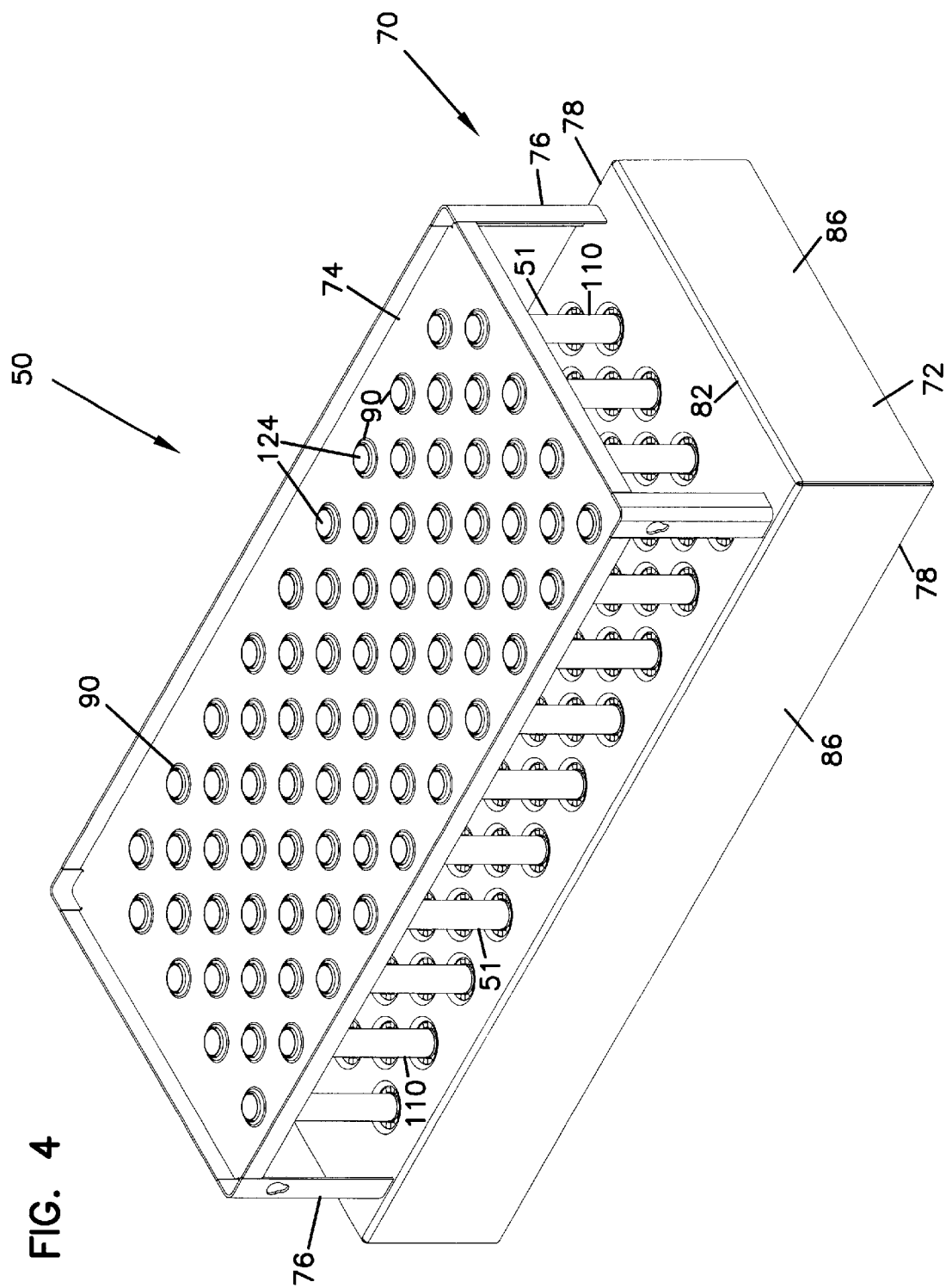
FIG. 4 is a perspective view of a centrifugal separator module, constructed according to principles of this disclosure.
Figure 11:
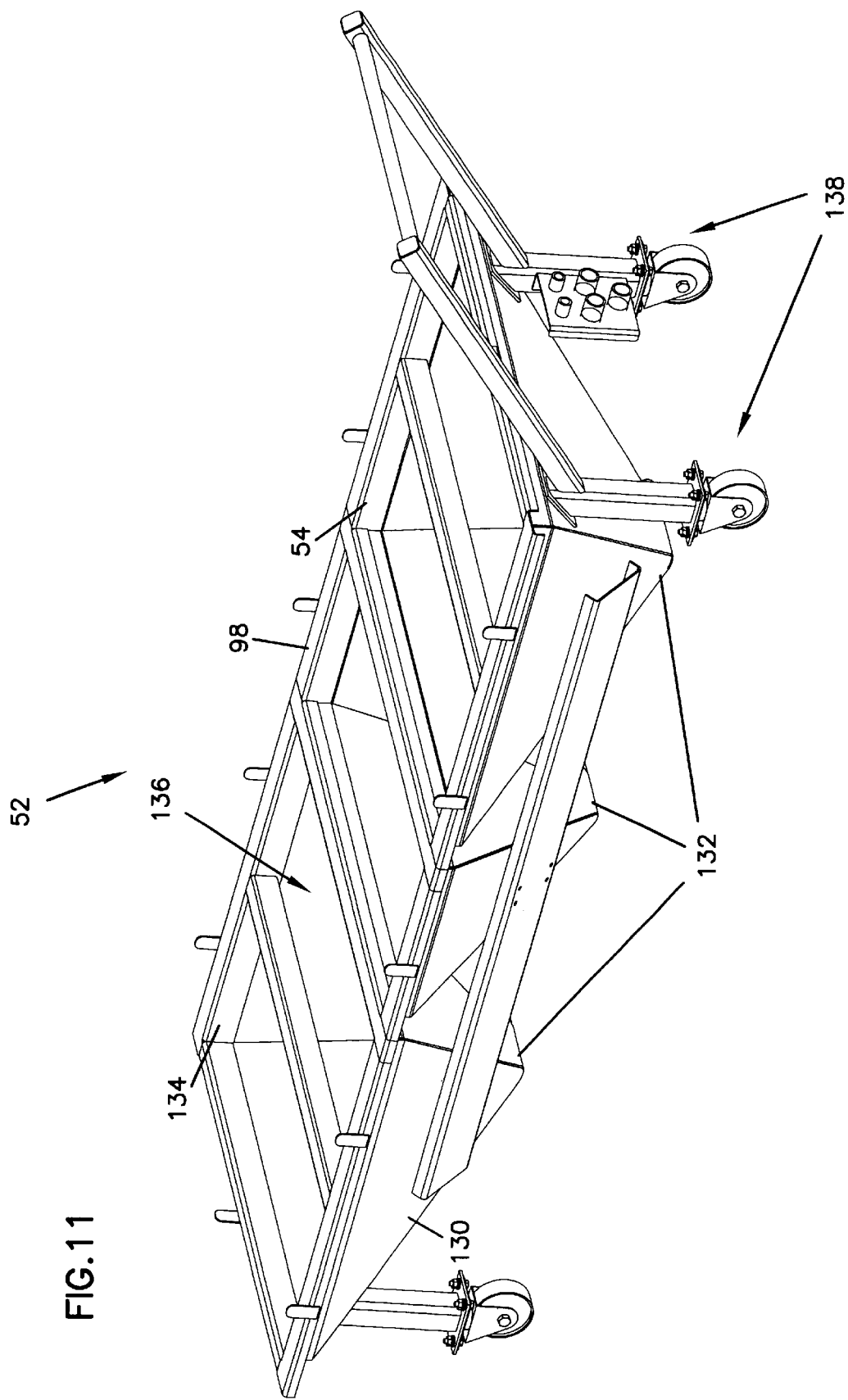
FIG. 11 is a perspective view of a hopper utilized in a system for separation, constructed according to principles of this disclosure.

In general, the powder coating (paint particles) recovery arrangement 26 includes a plurality of centrifugal separator modules 50. Each of the modules 50 is mounted and oriented on a hopper construction 52. A perspective view of one example centrifugal separator module 50 is shown in FIG. 4. Each module 50 preferably includes a plurality of centrifugal separators 51. A perspective view of one example hopper construction 52 is shown in FIG. 11. The hopper construction 52 illustrated in FIG. 11 is constructed to accommodate five individual separator modules 50. In other embodiments, the hopper construction 52 can be constructed to accommodate more or fewer modules 50.

Attention is directed to FIG. 2. FIG. 2 is a schematic, cross-sectional view that shows one of the modules 50 mounted on an open end 54 of the hopper 52. A clean air plenum or duct 56 is also illustrated. In general, in operation, the air/paint mixture 36 is directed into the paint recovery arrangement 26, through duct work 58. The air/paint particulate mixture 36 is directed into the centrifugal separator module 50. Within the centrifugal separator module 50, the air/paint mixture 36 interfaces with the centrifugal separators 51. The centrifugal separators 51 cause the air/paint mixture 36 to travel in a circular path and move downwardly toward the hopper construction 52. The heavier, powder coating (paint) particles entrained in the air are thrown laterally outwardly by centrifugal force and are caused to move downwardly under action of gravity and centrifugal force. The paint particles 60 then drop into the hopper construction 52, and are cycled back to the paint supply 23 through ducting 62. The air 64 that is separated from the air/paint mixture 36 moves inwardly and upwardly through the centrifugal separators 51 to the clean air duct 56. The air 64 carries with it only a small percentage of paint particles. This air 64 is then conveyed by way of duct work 37 (FIG. 1) to the air cleaner system 28.

The centrifugal separator module 50 is now described in greater detail. In FIG. 4, there is a perspective view of centrifugal separator module 50. The centrifugal separator module 50 includes a housing 70. In the particular housing 70 illustrated in FIG. 4, the housing 70 includes a box construction 72 and a panel 74. In preferred embodiments, the box construction 72 and the panel 74 are secured together with a plurality of legs 76. The box construction 72 separates the foreign particles (e.g., paint, dust) from the portions of the module 50 outside of the box construction 72. This type of construction aids in cleaning the module 50. In the one depicted in FIGS. 4 and 6, the box construction 72 has a plurality of spaced walls 78 defining an interior volume 80 therebetween. In particular, the walls 78 include a tube sheet or top wall 82, another tube sheet or bottom wall 84 (FIG. 6) and a plurality of sidewalls 86 extending between the top wall 82 and the bottom wall 84.

In the particular one depicted in FIG. 6, the top wall 82 is between the panel 74 and the bottom wall 84. As such, in the one depicted, the top wall 82 is also referred to as a middle tube sheet 82a. Similarly, the bottom wall 84, in the one depicted, is also referred to as a bottom tube sheet 84a. Note that the middle tube sheet 82a includes a plurality of apertures 85, at least selected ones of the apertures each for accommodating a centrifugal separator 51. More details regarding the construction of the middle tube sheet 82a are described below, in conjunction with the sealing arrangement between each centrifugal separator 51 and the middle tube sheet 82a.

Figure 8:
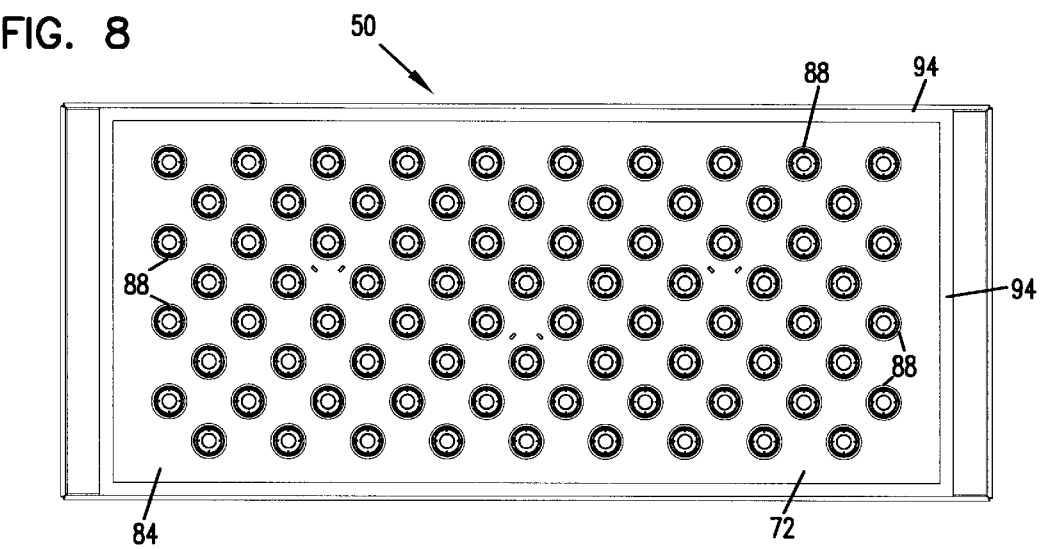
FIG. 8 is a bottom plan view of the centrifugal separator module shown in FIG. 7 and including a sealing arrangement.
Figure 9:
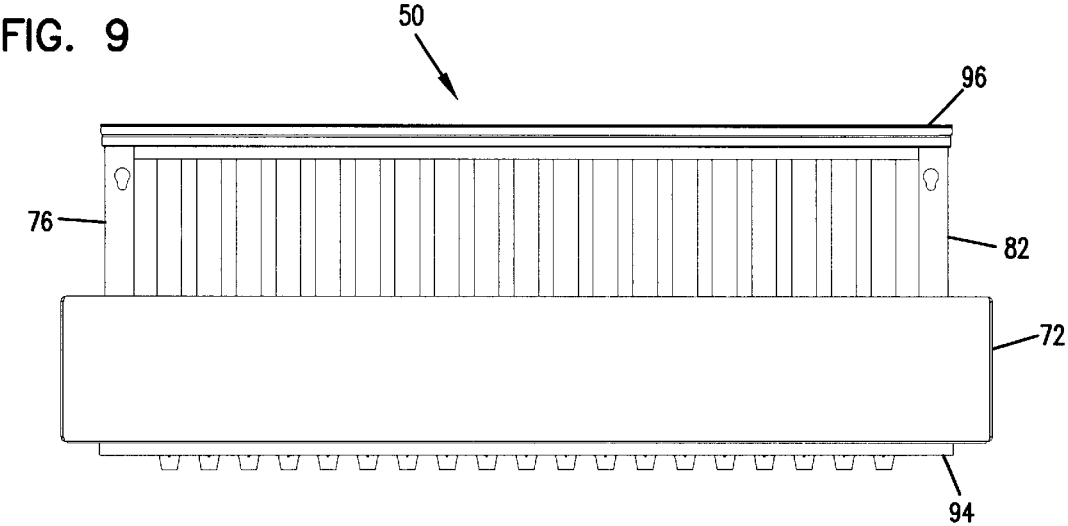
FIG. 9 is a side elevational view of the centrifugal separator module illustrated in FIGS. 7–8.

Attention is directed to FIG. 8. FIG. 8 is a bottom plan view of the centrifugal separator module 50. As can be seen in FIG. 8, in the particular bottom wall 84 illustrated, there is a plurality of apertures 88 extending therethrough. As will be described in further detail below, the apertures 88 allow portions of the centrifugal separators 51 to extend therethrough.

Figure 7:
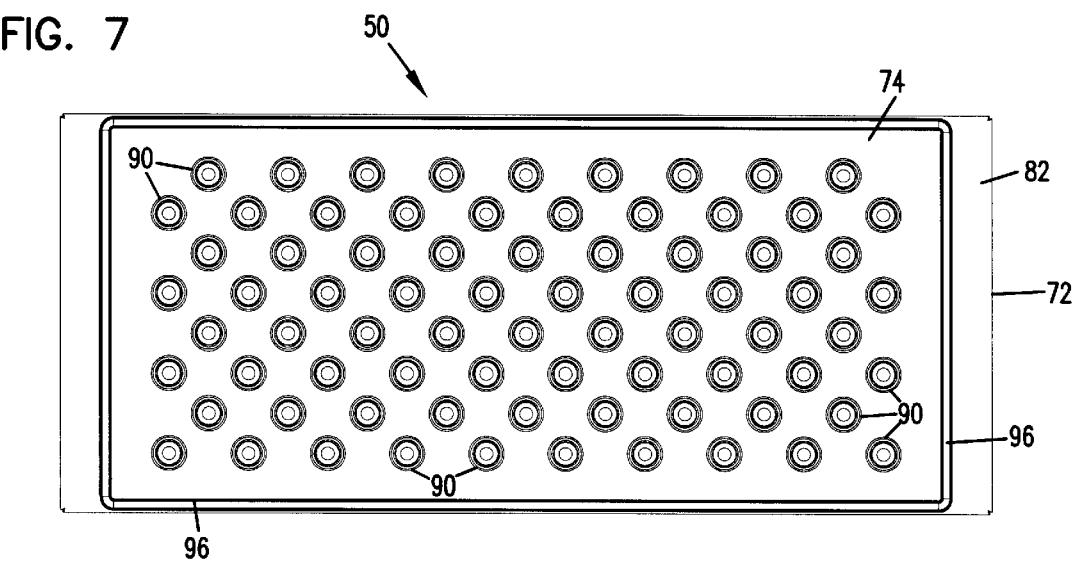
FIG. 7 is a top plan view of the centrifugal separator module of FIG. 5 and including a sealing arrangement.

Analogously, in FIG. 7, which is a top plan view of the centrifugal separator module 50, the panel 74 defines a plurality of apertures 90 extending therethrough. As will be described further below, the apertures 90 also permit portions of the individual centrifugal separators 51 to extend therethrough. The centrifugal separator module 50 accommodates a sealing arrangement 92 (FIG. 2). In the particular embodiment illustrated, the sealing arrangement 92 includes first and second gasket members 94, 96 secured to the centrifugal separator module 50.

Attention is directed to FIG. 8. FIG. 8 shows the first gasket member 94 secured to the bottom wall 84 and circumscribing all of the apertures 88. In preferred embodiments, the first gasket member 94 is constructed of a single piece of urethane. One preferred urethane is a microcellular urethane with pressure sensitive adhesive applied thereto. In this manner, the first gasket 94 may be secured to the bottom wall 84. Attention is again directed to FIG. 2. In FIG. 2, it can be seen that the first gasket member 94 is compressed against a sealing surface 98 (FIG. 11) of the hopper construction 52. This compression forms a seal 100 between and against the hopper construction 52 and the bottom wall 84 of the centrifugal separator module 50.

Attention is now directed to FIG. 7. FIG. 7 illustrates the second gasket member 96 secured to the panel 74. The second gasket member 96 preferably extends around the entire perimeter of the panel 74 to circumscribe all of the apertures 90. In FIG. 3, an enlarged view of the second gasket member 96 is shown in an uncompressed state between the separator module 50 and the clean air plenum or duct 56. In the preferred embodiment shown, the second gasket member 96 comprises a bulb gasket, which forms a seal 102 between and against the panel 74 of the centrifugal separator module 50 and the duct 56.

Figure 10:
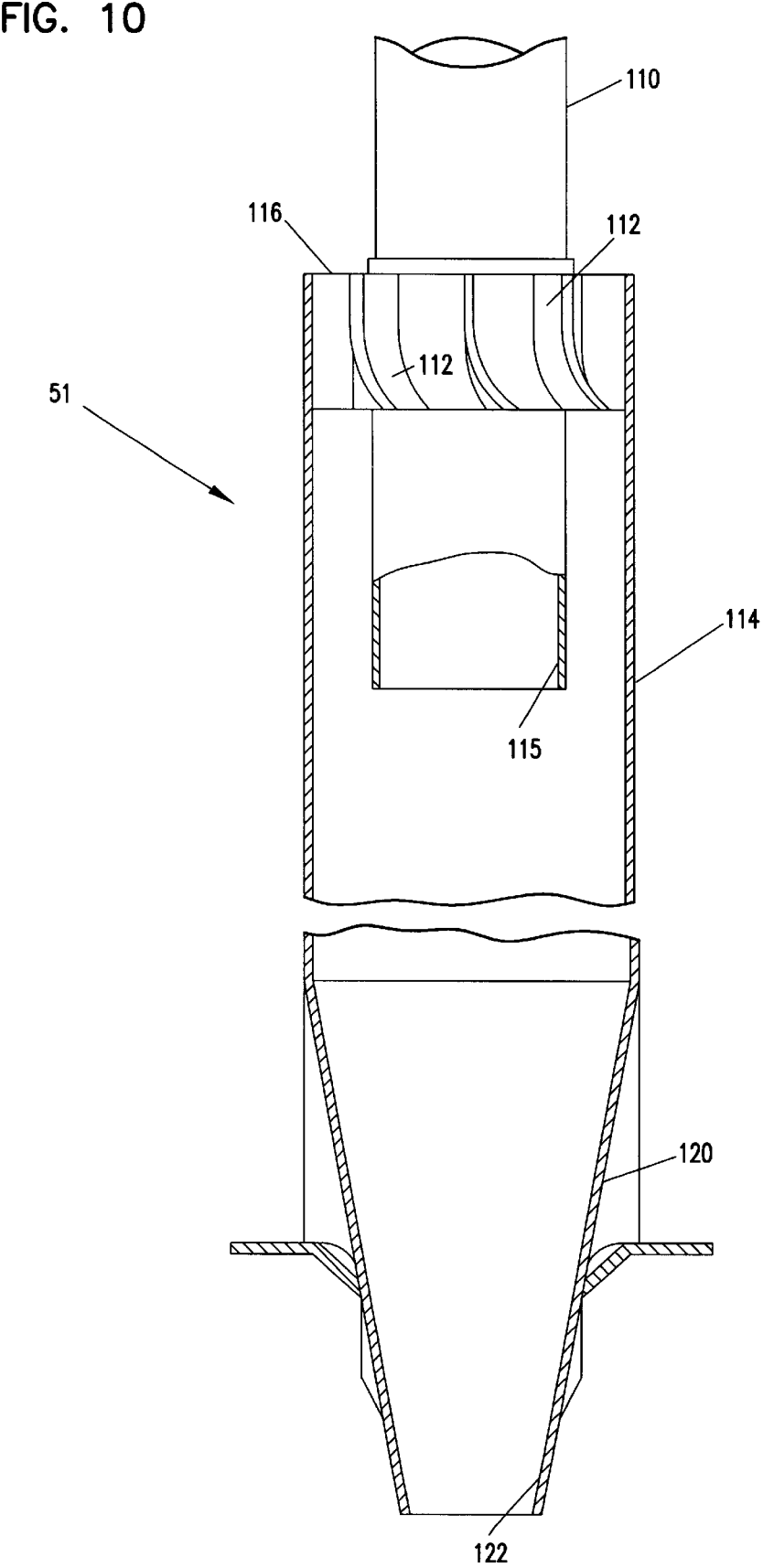
FIG. 10 is an enlarged cross-sectional view of a centrifugal separator utilized in the centrifugal separator module shown in FIGS. 5–9.

As mentioned above, each centrifugal separator module 50 includes plural centrifugal separators 51 that are held by the housing 70. Each centrifugal separator 51 includes a central hub member 110, a plurality of deflecting vanes 112, and a lower tube 114. Attention is directed to FIG. 10. FIG. 10 shows one particular embodiment for the centrifugal separator 51. The central hub member 110 generally comprises a hollow, cylindrical member defining a clean air flow passage 115 therethrough. By "clean air flow passage", it is meant that the air that flows through the passage 115 has had an initial amount of separation of particles (paint or dust or other particulate matter) from the gas stream, but is not necessarily 100% or even 99% clean of foreign particles, (which is one reason why the gas stream is then directed to the air cleaner system 28.) When arranged in the centrifugal separator module 50, each of the central hub members 110 is secured to the panel 74 and extends through the apertures 90. In preferred embodiments, the hub member 110 is secured to the panel 74 by crimping the hub member 110 to be in engagement with the apertures 90.

Still referring to FIG. 10, the deflecting vanes 112 generally comprise a plurality of circumferentially spaced deflecting vanes positioned adjacent to the hub member 110 in a radiating orientation therewith. Each of the deflecting vanes 112 is within the interior volume 80 of the box construction 72, as can be seen in FIG. 6. The deflecting vanes 112 help to cause the air/paint mixture 36 entering the upper end 116 of the lower tube 114 to travel in a circular path as it moves downwardly through the tube 114. The vanes 112 help to cause the heavier paint particles entrained in the air to be thrown laterally outwardly by centrifugal force. Gravity and centrifugal force cause the paint particles to move downwardly along the lower tube 114.

Again in reference to FIG. 10, the lower tube 114 preferably is arranged to circumscribe a portion 118 of the central hub member 110 as well as the circumferentially spaced deflecting vanes 112. As can be seen in FIG. 6, each of the lower tubes 114 is at least partially within the interior volume 80 of the box construction 72. Each of the lower tubes 114 is preferably secured to the box construction 72. In the embodiment shown in FIG. 6, the lower tubes 114 are secured to the bottom wall 84 and extend through the plurality of apertures 88. Referring again to FIG. 10, it can be seen that the lower tube 114 has a tapered nose 120 terminating in a discharge port 122. Referring again to FIG. 6, it can be seen that each of the discharge ports 122 extend through the apertures 88 and are generally exterior of the internal volume 80. The discharge ports 122 permit the gravity deposition of paint particles separated from the air/paint mixture 36. The paint particles drop through the discharge port 122 into the hopper construction 52.

Figure 12:
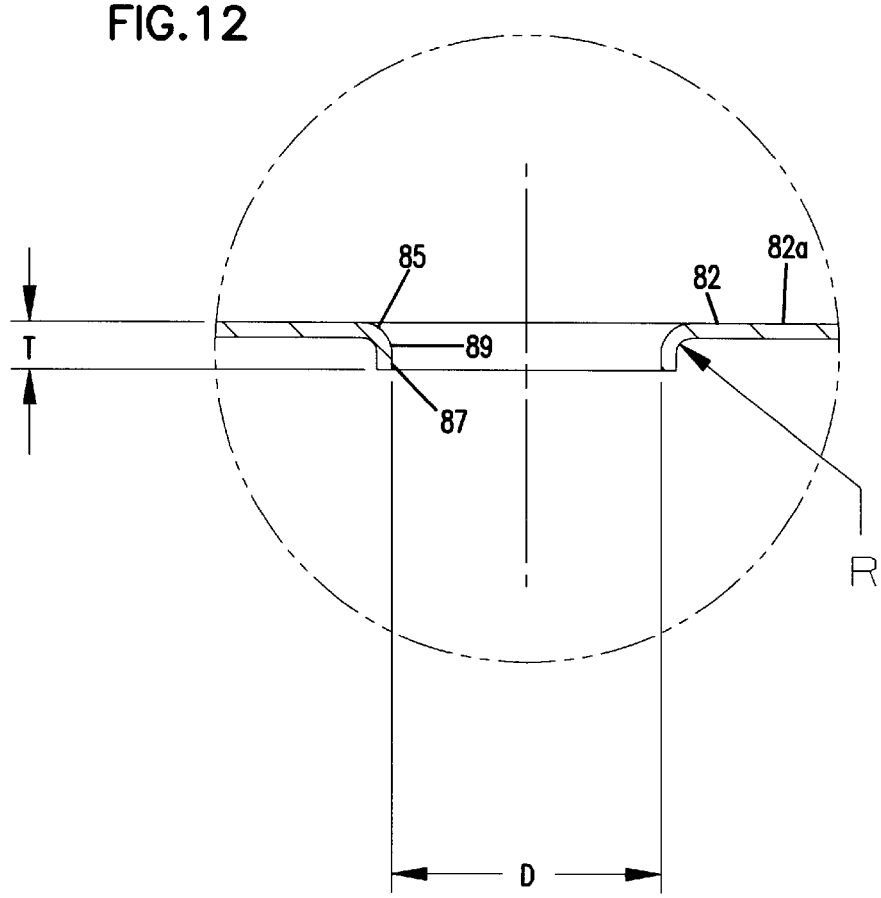
FIG. 12 is an enlarged, cross-sectional view of a portion of a box construction utilized in the centrifugal separator module illustrated in FIGS. 7–9, and without any centrifugal separators mounted therein.
Figure 13:
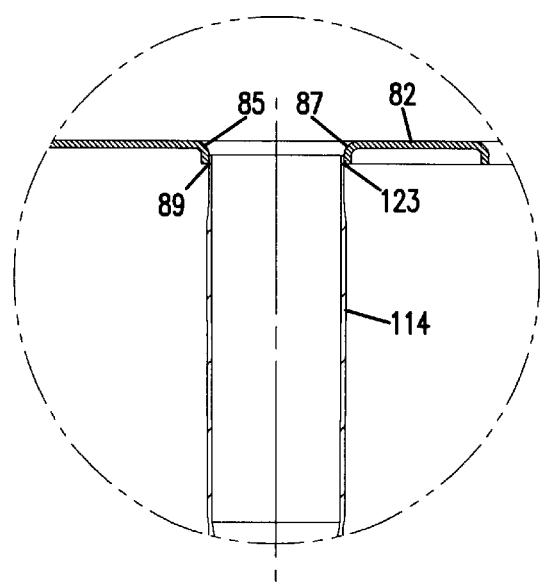
FIG. 13 is an enlarged cross-sectional view of the portion of the box construction depicted in FIG. 12 and with a lower tube of a centrifugal separator mounted therein.

Attention is directed to FIGS. 12 and 13. FIG. 12 is an enlarged cross-sectional view of a portion of the top wall 82 (i.e., middle tube sheet 82a), the cross-section passing through one of the apertures 85. The apertures 85 are sized and arranged to each accommodate and hold in a sealing engagement one of the centrifugal separators 51. In particular, each of the lower tubes 114 engages, in a friction fit, one of the apertures 85, to form a seal 123 between the tube 114 and the wall 82. The seal 123 acts to prevent particles (such as paint particles) from migrating into or entering the interior volume of the box construction 72. The seal 123 between the tube 114 and the wall 82 is preferred because without such a seal, powder coating particles would collect in the vicinity of the lower tubes 114, e.g. around the tapered noses 120, and would be difficult to clean. This result would tend to detract from the convenience of changing paint colors.

Still in reference to FIGS. 12 and 13, note that each aperture 85 includes a flanged section 87, with a length of T. The flanged section 87 provides a sealing surface 89 to which the seal 123 can be formed against. The inner diameter, D, of the apertures 85 and the outer diameter of the lower tubes 114 are constructed to have a tight, interference fit in order to result in the seal 123. In one embodiment, the lower tubes 114 are constructed of a thin, flexible plastic in order to tightly or pressure fit inside of the apertures 85. Although the size of the apertures 85 can change, based on the desired size of the lower tubes 114 and other factors, the following dimensions are suitable: a diameter D of at least 1 inch, no greater than 2 inches, and preferably 1.4 inches; a length of flanged section from a top surface of the wall 82 of at least 0.1 inch; no greater than 1 inch; and preferably 0.25 inch; and a radius R that forms the flanged section 87 of at least 0.04 inch, no greater than 0.2 inch, and preferably 0.08 inch.

Preferably, each of the centrifugal separator modules 50 includes at least 50 centrifugal separators 51, no more than 100 centrifugal separators 51, and typically about 60–80 centrifugal separators 51.

To summarize operation of the centrifugal separators 51, the air/paint mixture 36 is directed into each of the centrifugal separators 51 at the upper end 116 of the lower tubes 114. The air/paint mixture 36 encounters the vanes 112, which causes the air/paint mixture 36 to travel in a circular path. This causes the heavier paint particles entrained in the air to be thrown laterally outwardly by centrifugal force. Gravity causes the paint particles to move downwardly to the tapered nose 120 and out through the discharge port 122 into the hopper construction 52. The air in the tube 114 moves inwardly and upwardly through the clean airflow passage 115 of the hub member 110. The clean air moves upwardly through the passage 115 and out through outflow ports 124 where it then flows into the duct 56.

Attention is directed to FIG. 11. Further details on the hopper construction 52 are now described. The hopper construction 52 includes a wall construction 130. In the particular embodiment illustrated in FIG. 11, the wall construction 130 is constructed and arranged to form a closed end 132 and an open end 134. The wall construction 130 and the closed end 132 together define a collection chamber 136. The collection chamber 136 is oriented to receive the paint particles that are discharged through the discharge ports 122 of the centrifugal separators 51. The paint collected in the collection chamber 136 is ducted or conveyed back to the paint supply 23 through the ducting 62, for recycling and reuse.

The hopper construction 52 is preferably designed to be easily transportable and very mobile. In this way, when it is desired to change the color of the paint being applied, the hopper construction 52 along with the plurality of centrifugal separator modules 50 installed thereon can be quickly and easily moved from its position downstream of the paint booth 22. A second, clean hopper with clean modules can replace the first one downstream of the paint booth 22, in order to permit the collection and recycling of the new paint color. In the particular hopper construction 52 shown in FIG. 11, the hopper construction 52 includes casters 138 to allow for the easy, efficient, and quick change out of the centrifugal separator modules 50 and the hopper construction 52.

The hopper construction 52 illustrated in FIG. 11 accommodates five centrifugal separator modules 50. Each of the centrifugal separator modules 50 is oriented in communication with the open end 134 in the manner shown in FIG. 2. Once the modules 50 are mounted on the open end 134, the entire hopper construction 52 carrying the plural modules 50 comprise a system for providing centrifugal separation 44. The system 44 is oriented in place downstream of the paint booth 22. Appropriate pneumatics, hydraulics, and other mechanisms lift the hopper construction 52 with its plurality of centrifugal separator modules 50 oriented in place against the clean air duct 56 in order to compress the first and second gasket members 94, 96 and form the seals 100, 102.

Preferably, the system for providing centrifugal separation 44 will include no more than 10 centrifugal separator modules 50, at least three centrifugal separator modules 50, and typically 4–6 centrifugal separator modules 50.

A method for recovering paint utilizing the constructions and principles described above can now be described. In general, the article 30 to be painted is mounted in the paint booth 22. Paint 32 is directed at the article 30 by way of discharge gun 24. The air/paint mixture 36 is directed into the paint recovery arrangement 26. The air/paint mixture 36 encounters the plurality of centrifugal separator modules 50. The air/paint mixture 36 is directed through the upper end 116 of each of the lower tubes 114. The vanes 112 induce helical motion. This causes the paint particles in the air/paint mixture 36 to be directed outwardly and downwardly along the lower tube 114 and eventually out through the discharge port 122. The paint falls by gravity into the collection chamber 136 of the hopper construction 52. The collected paint is directed by way of ducting 62 back to the paint supply 23, for re-use. In the meantime, the cleaned air passes through the clean airflow passage 115. The clean air flows into the duct 56 and is directed by way of duct work 37 to the air cleaner system 28. There, the air encounters a plurality of cylindrical air filters 42. Most of the remaining paint is collected by the filter elements 42, and any remaining paint particles are directed into the scrap barrel 38. The cleaned air passes into the interior of each of the filter elements 42 and is finally discharged.

When it is desired to change paint colors, the operation of the paint booth is temporarily terminated, and the hopper construction 52 holding the plurality of centrifugal separator modules 50 is removed from operable gas flow communication with paint booth 22. Generally speaking, a second, clean hopper construction loaded with plural centrifugal separator modules 50 may be wheeled into operable gas flow communication with the paint booth 22. The seals 100, 102 are created, and the painting may again begin in the new select color.

The above represents a complete description of the invention. There are many embodiments that may be constructed according to these principles.

We claim:

1. A centrifugal separator module arrangement comprising:
   (a) a housing; said housing including a box construction and a panel secured together;
      (i) said box construction having a plurality of spaced walls defining an interior volume;
         (A) at least one of said spaced walls including a first plurality of apertures;
         (B) a first gasket member secured to said box construction;
      (ii) said panel including a second plurality of apertures;
         (A) a second gasket member secured to said panel;
   (b) a plurality of centrifugal separators held by said housing; each of said centrifugal separators including:
      (i) a central hub member defining a clean airflow passage therethrough;
         (A) each of said hub members being secured to said panel and extending through said second plurality of apertures;
      (ii) a plurality of circumferentially spaced deflecting vanes positioned adjacent to said hub member in a radiating orientation therewith;
         (A) each of said plurality of circumferentially spaced deflecting vanes being within said interior volume of said box construction;
      (iii) a lower tube circumscribing: (A) a portion of said central hub member; and (B) said plurality of circumferentially spaced deflecting vanes;
         (A) each of said lower tubes being at least partially within said interior volume of said box construction;
         (B) each of said lower tubes being secured to said box construction and extending through said first plurality of apertures.

2. A module arrangement according to claim 1 wherein:
   (a) said first gasket member extends along an entire perimeter of said box construction; and
   (b) said second gasket member extends along an entire perimeter of said panel.

3. A module arrangement according to claim 1 further including:
   (a) a seal between each of said centrifugal separators and said first plurality of apertures.

4. A module arrangement according to claim 1 wherein:
   (a) said plurality of centrifugal separators includes no more than 100 centrifugal separators.

5. A module arrangement according to claim 1 further including:
   (a) a plurality of legs securing said box construction and said panel.

6. A module arrangement according to claim 1 wherein:
   (a) said box construction plurality of spaced walls includes: a top wall; a bottom wall; and a plurality of side walls extending between the top wall and the bottom wall;
      (i) said top wall defining said first plurality of apertures; and
      (ii) said bottom wall defining a third plurality of apertures;
         (A) each of said hub members extending through said third plurality of apertures.

7. A module arrangement according to claim 6 wherein:
   (a) said first gasket member is secured to said bottom wall.

8. A system for providing centrifugal separation; the system comprising:
   (a) a hopper; said hopper having a wall construction constructed and arranged to form a closed end and an open end;
      (i) said wall construction and said closed end defining a collection chamber;
   (b) a plurality of centrifugal separator modules mounted on said open end; each of said centrifugal separator modules being in gas flow communication with said collection chamber; each of said centrifugal separator modules including:
      (i) a housing;
      (ii) a plurality of centrifugal separators held by said housing; each of said centrifugal separators including:
         (A) a central hub member defining a clean airflow passage therethrough;
         (B) a plurality of circumferentially spaced deflecting vanes positioned adjacent to said hub member in a radiating orientation therewith;
         (C) a lower tube circumscribing: (A) a portion of said central hub member; and (B) said plurality of circumferentially spaced deflecting vanes; and
   (c) a seal arrangement; said seal arrangement forming a seal between each of said centrifugal separator modules and said hopper.

9. A system according to claim 8 wherein:
   (a) said plurality of centrifugal separator modules includes no more than 10.

10. A system according to claim 9 wherein:
    (a) said plurality of centrifugal separator modules includes at least 3.

11. A system according to claim 8 wherein:
    (a) said hopper includes a plurality of casters.

12. A system according to claim 8 wherein:
    (a) said housing includes a box construction and a panel secured together;
       (i) said box construction having a plurality of spaced walls defining an interior volume;
          (A) at least one of said spaced walls including a first plurality of apertures;

(ii) said panel including a second plurality of apertures;
(iii) each of said hub members being secured to said panel and extending through said second plurality of apertures;
(iv) each of said plurality of circumferentially spaced deflecting vanes being within said interior volume of said box construction;
(v) each of said lower tubes being at least partially within said interior volume of said box construction; and
(vi) each of said lower tubes being secured to said box construction and extending through and forming a seal with said first plurality of apertures.

13. A system according to claim 12 wherein:
(a) said seal arrangement includes a plurality of gasket members; each of said gasket members forming a seal between one of said box constructions and said hopper.

14. A coating recovery system comprising:
(a) a booth; said booth generating a gas stream entrained with coating particles;
(b) a plurality of centrifugal separator modules downstream of said booth; each of said centrifugal separator modules including:
   (i) a housing;
   (ii) a plurality of centrifugal separators held by said housing; each of said centrifugal separators constructed and arranged to separate at least a portion of the coating particles from the gas stream; each of the centrifugal separators including:
      (A) a central hub member defining a clean gas flow passage therethrough;
      (B) a plurality of circumferentially spaced deflecting vanes positioned adjacent to said hub member in a radiating orientation therewith;
      (C) a lower tube circumscribing: (A) a portion of said central hub member; and (B) said plurality of circumferentially spaced deflecting vanes;
(c) a duct; said duct forming a clean gas plenum and being oriented downstream of and in gas flow communication with each of said clean gas flow passages of said central hub members;
(d) a seal arrangement; said seal arrangement forming a seal between said duct and each of said centrifugal separator modules; and
(e) a gas flow direction arrangement to direct the gas stream entrained with coating particles from said booth, through said plurality of centrifugal separator modules to separate the coating particles from the gas stream, and direct the cleaned gas stream into said duct.

15. A system according to claim 14 further including:
(a) a hopper downstream of said plurality of centrifugal separator modules; said hopper having a wall construction constructed and arranged to form a closed end and an open end;
   (i) said wall construction and said closed end defining a collection chamber to collect paint particles separated from the gas stream by said plurality of centrifugal separator modules;
   (ii) each of said centrifugal separator modules being oriented in said open end of said hopper; and
(b) a gasket arrangement; said gasket arrangement forming a seal between each of said centrifugal separator modules and said hopper.

16. A method of recovering powder coating; the method comprising:
(a) directing a gas stream entrained with powder coating particles from a paint booth into a system holding a plurality of modules; each of the modules having centrifugal separators separating at least a portion of the powder coating particles from the gas stream;
   (i) the system being removable and replaceable from operable communication with the paint booth;
(b) each of the centrifugal separators including:
   (i) a central hub member defining a clean gas flow passage therethrough;
   (ii) a plurality of circumferentially spaced deflecting vanes positioned adjacent to the hub member in a radiating orientation therewith;
   (iii) a lower tube circumscribing:
      (A) a portion of the central hub member; and
      (B) the plurality of circumferentially spaced deflecting vanes;
(c) each of the modules including:
   (i) a housing; the housing including a box construction and a panel secured together;
      (A) the box construction having a plurality of spaced walls defining an interior volume;
         (1) at least one of the spaced walls including a first plurality of apertures;
      (B) the panel including a second plurality of apertures;
   (ii) the plurality of centrifugal separators held by the housing;
      (A) each of the hub members being secured to the panel and extending through the second plurality of apertures;
      (B) each of the plurality of circumferentially spaced deflecting vanes being within the interior volume of the box construction;
      (C) each of the lower tubes being at least partially within the interior volume of the box construction; and
      (D) each of the lower tubes being sealed to the box construction and extending through the first plurality of apertures.

17. A method according to claim 16 further including:
(a) terminating operation of the paint booth;
(b) removing the system holding the plurality of modules; and
(c) orienting a second system holding a new plurality of modules downstream of the paint booth.

* * * * *